United States Patent

[11] 3,581,429

| [72] | Inventors | Allison L. Hickman<br>Vallejo;<br>Ernest S. Nagy, Napa; George A. Scriven,<br>West Napa, all of, Calif. |
|---|---|---|
| [21] | Appl. No. | 813,917 |
| [22] | Filed | Apr. 7, 1969 |
| [45] | Patented | June 1, 1971 |
| [73] | Assignee | Gordon Wood<br>Sansalito, Calif. |

[54] INSECT TRAP
9 Claims, 7 Drawing Figs.

| [52] | U.S. Cl. | 43/107 |
|---|---|---|
| [51] | Int. Cl. | A01m 1/00 |
| [50] | Field of Search | 43/118, 121, 122, 100, 105, 107, 122, 65 |

[56] References Cited
UNITED STATES PATENTS

| 404,565 | 6/1889 | Schuyler | 43/118 |
|---|---|---|---|
| 850,123 | 4/1907 | Algate | 43/105X |
| 1,024,187 | 4/1912 | Donaldson | 43/107 |
| 1,057,867 | 4/1913 | Meadows | 43/118 |
| 1,333,470 | 3/1920 | Curran | 43/107 |
| 1,606,568 | 11/1926 | Gross | 43/107 |

*Primary Examiner*—Warner H. Camp
*Attorney*—Gordon Wood

ABSTRACT: An insect trap of the type which takes advantage of the fact that most insects fly upwardly toward the light after sampling the bait. A trap of this type is provided made of inexpensive disposable material so that when the trap is filled with insects the entire trap may be discarded. The trap is collapsible to a substantially flat form for shipping and handling.

PATENTED JUN 1 1971
3,581,429
SHEET 1 OF 2
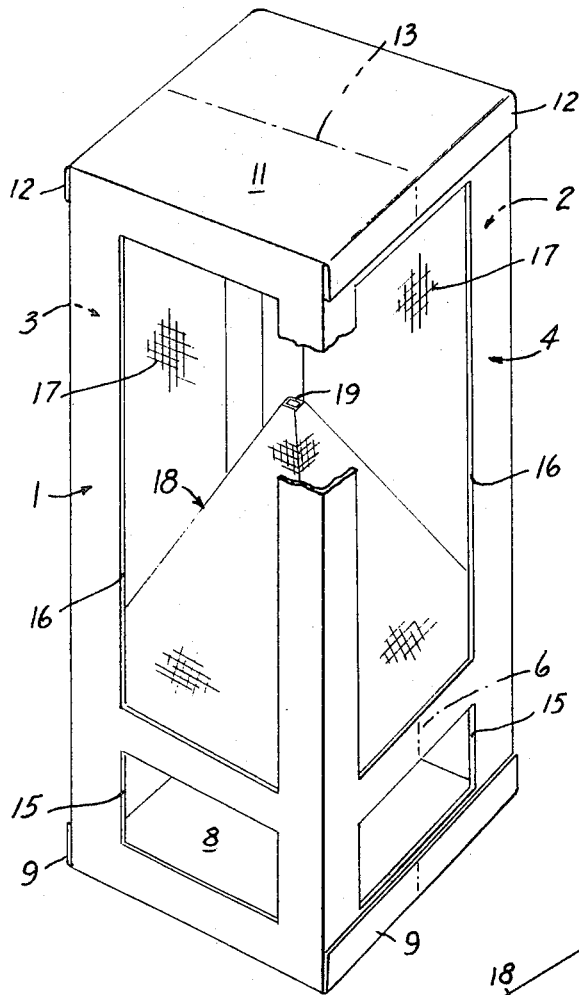
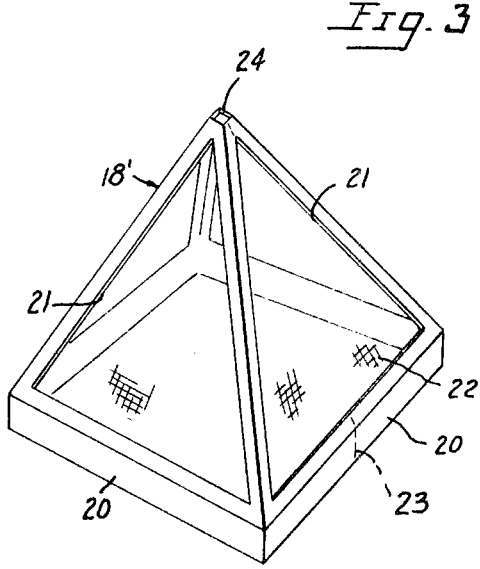
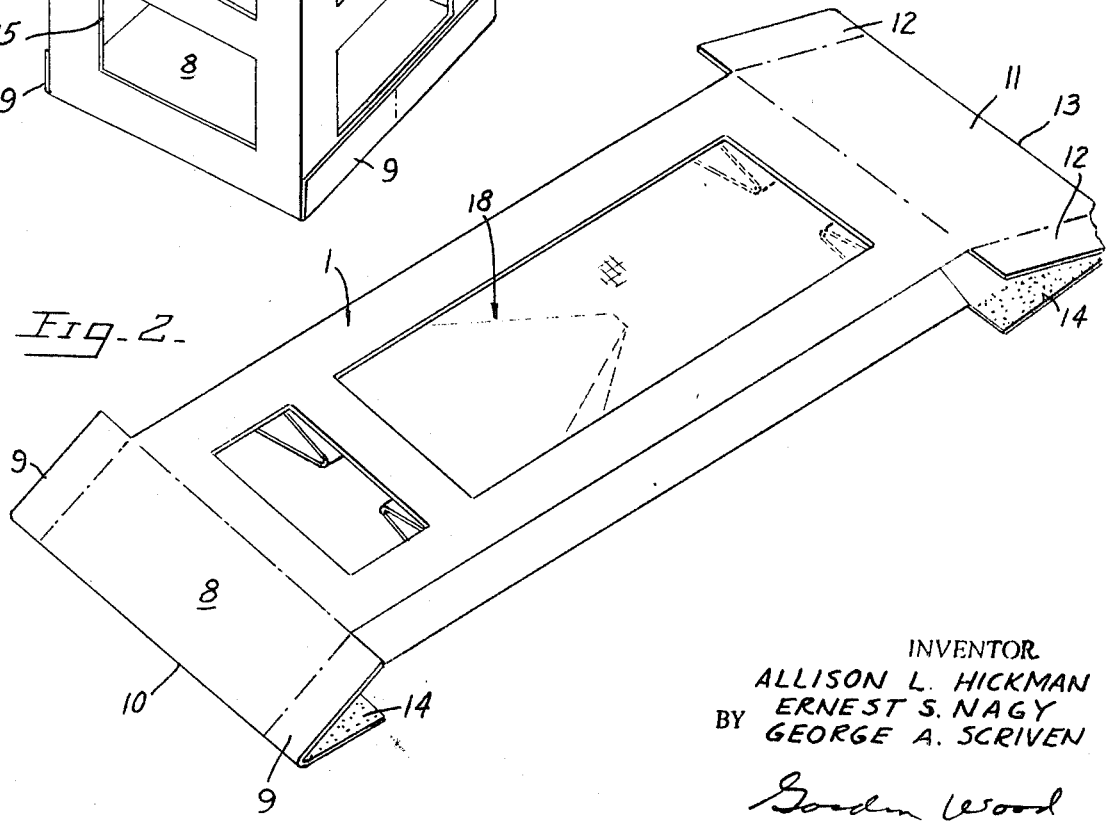
INVENTOR.
ALLISON L. HICKMAN
ERNEST S. NAGY
BY GEORGE A. SCRIVEN
Gordon Wood

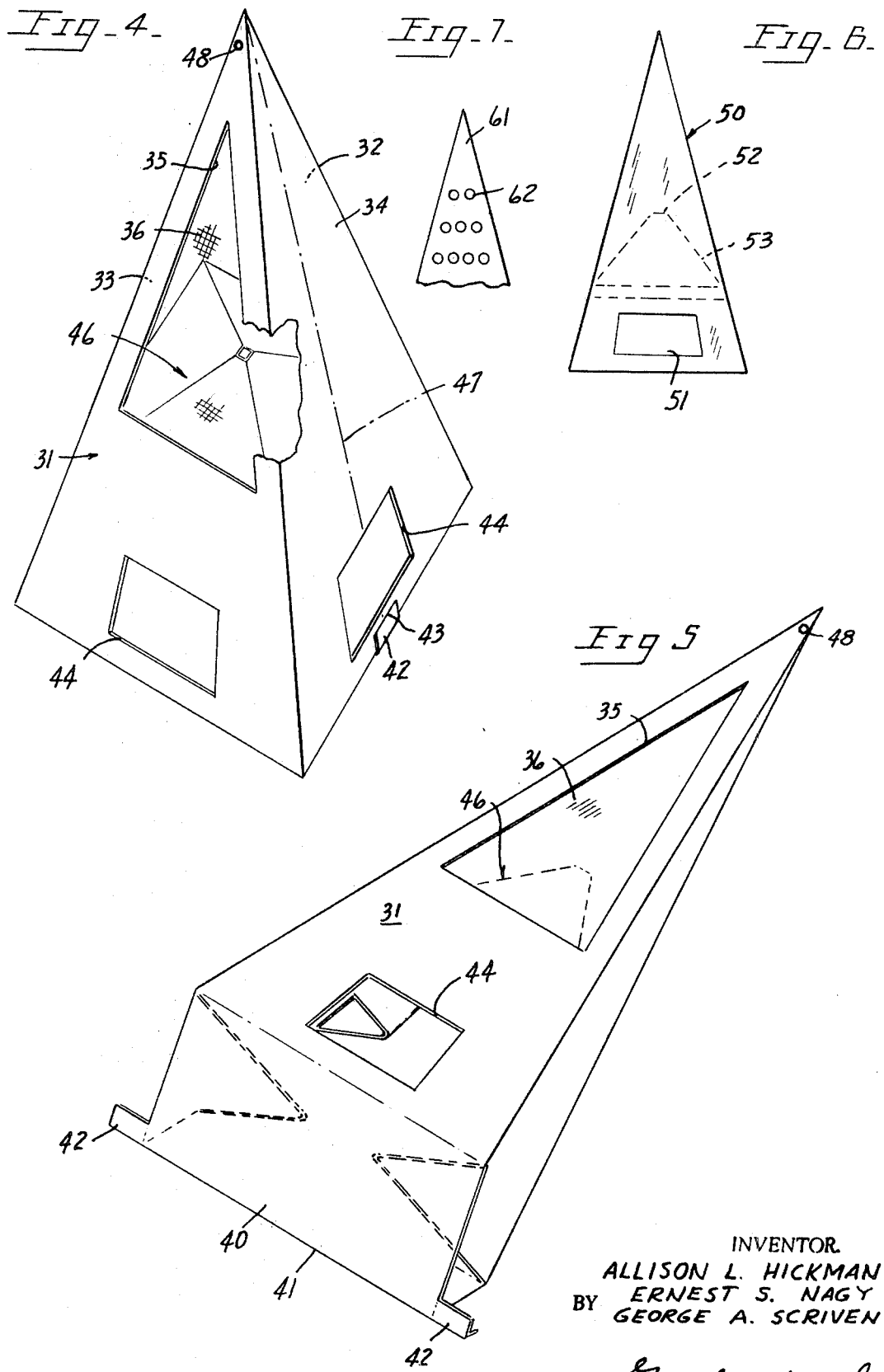

INSECT TRAP

This invention relates to insect traps and more particularly to the type of trap wherein the insect flies upwardly after sampling the bait and enters an upper compartment through a relatively small aperture and is trapped in such upper compartment.

Numerous insect traps have been provided heretofore for the purpose of trapping yellow jackets, flies and other insects and operating on the principle that the insect, after sampling the bait, will fly upwardly toward the light. By providing an upwardly extending passageway with a relatively small aperture at its upper end, the insect flies or crawls through the aperture and into an upper compartment in which it is trapped.

One of the disadvantages of prior art insect traps employing this principle is that after the trap becomes loaded with insects it is a disagreeable operation to empty the same so that it can continue to be used. Furthermore, the bait that is employed in the trap to attract the insects becomes rancid and causes disagreeable odors. The cleaning of the bait space to eliminate such odors is another disagreeable task.

The main object of the present invention is to overcome the disadvantages of prior art insect traps of the subject type.

Another object of the invention is the provision of an inexpensive insect trap which is adapted to be disposed of after the same has become filed with insects.

Still another object of the invention is the provision of an insect trap of relatively large dimensions adapted to trap a great number of insects and which trap may be shipped and handled in a collapsed flattened form and may be quickly erected at the time it is to be used.

Other objects and advantages of the present invention will be apparent from the following specification and from the drawings:

FIG. 1 is a perspective of an insect trap made in accordance with the present invention with a portion of the sidewalls broken away to show internal structure.

FIG. 2 is a perspective of the insect trap of FIG. 1 folded into a substantially flat condition for shipping and handling.

FIG. 3 is a perspective of the passageway or conduit structure showing a modified form thereof.

FIG. 4 is a perspective of a modified form of the invention.

FIG. 5 is a perspective of the insect trap of FIG. 4 folded into a substantially flat condition for shipping and handling.

FIG. 6 is a reduced front elevation of another modified form of the invention.

FIG. 7 is a fragmentary front elevation of the upper portion of a panel of an insect trap showing another modification.

In detail, and first with reference to FIG. 1, one form of the invention comprises a vertically extending container of generally rectangular configuration and including a first pair of opposed sides generally designated 1,2 and a second pair of opposed sides generally designated 3,4 All of the sides are substantially similar except that the opposed sides 1,2 are flat and remain flat, whereas the opposed sides 3,4 are provided with vertically extending central creases 6 so that each of the sides 3,4 may be folded on itself along the crease lines 6.

The bottom of the trap is formed by a panel 8 which may be a continuation of the opposite sides 1,2 and which panel is provided with a pair of flaps 9 along its opposite side edges and adapted to engage the lower marginal portions of the sidewalls 3,4 when the device is expanded. Panel 8 and flaps 9 are provided with a central crease 10 which permits the panel 8 to be folded flat upon itself as best seen in FIG. 2. Similarly, the top of the trap is formed by a panel 11 having a pair of opposite side flaps 12 which are adapted to engage the upper marginal portions of sidewalls 3,4. Top panel 11 is formed with a crease line 13 similar to crease line 10 so that when the device is flattened as shown in FIG. 2 the top panel 11 is folded on itself. The flaps 9,12 may be provided along their inner surfaces with a pressure sensitive adhesive 14 which, when the device is expanded to the shape of FIG. 1, adherently secures the flaps 9,12 to the upper and lower margins of the opposed sidewalls 3,4.

Adjacent the bottom of the container the sidewalls 1 to 4 are provided with relatively large openings 15 and insects may enter through said openings 15 to reach the bait (not shown) supported on the bottom panel 8. Spaced upwardly from the openings 15 the sidewalls are provided with relatively large openings 16 to admit light into the interior of the container. Said openings 16 are preferably covered with a very lightweight mesh 17 which effectively prevents escape of the insects in the upper portion of the container.

Positioned within the above-described container is a generally pyramidal-shaped screen, generally designated 18, the lower periphery of which may be adherently secured to the sidewalls along those portions of the latter between the openings 15 and 16. The upper end of the pyramidal screen 18 is formed with an aperture 19. It will be seen that the structure 18 defines a generally upwardly extending passageway or conduit communicating between the upper and lower ends of the container so that the insects, after sampling the bait in the lower end of the container, fly upwardly and crawl through the aperture 19 into the upper end of the container and become trapped therein.

It will be seen that the folded substantially flat structure of FIG. 2 is readily packaged and may be shipped in a large envelope or the like and retained in the latter until it is desired to expand it into the form of FIG. 1.

Although the pyramidal screen 18 is formed of relatively light mesh it still has sufficient stiffness to maintain the generally pyramidal form shown in FIG. 1 when the container is expanded. Of course when the container is flattened to the form of FIG. 2 the screen 18 also flattens out between the sidewalls.

A modified form of passageway is shown in FIG. 3 and generally designated 18'. In this case a generally pyramidal four sided structure is formed of paperboard and includes a vertically disposed lower peripheral flange 20 which may be adherently secured to the inner sides of the container between the openings 15,16. The sides of the structure of FIG. 3 are cut out to provide relatively large triangular openings 21 which may be covered with mesh 22. In this case two opposed sides of the structure may be provided with creases 23 which, when the container is folded, lie alongside the creases 6 of the sidewalls 3,4. As in the previously described screen a relatively small aperture 24 is provided at the upper end of the structure through which the insects may pass.

A modified form of the invention as shown in FIGS. 4 and 5 wherein a generally pyramidal container is formed of two pairs of opposed sidewalls, one pair being designated 31,32 and the other pair 33,34. In this case, only the opposed sidewalls 31,32 are provided with relatively large triangular openings 35 covered by mesh 36 to admit light into the interior of the container.

The bottom panel 40 may be a continuation of opposed sides 31,32 and formed with a crease line 41 (FIG. 5) to permit the panel to be folded on itself in the collapsed condition of the container shown in FIG. 5. In this case the panel 40 is formed at the crease line 41 with tabs 42 which, when the device is expanded, may be fitted within slots 43 formed in the lower marginal portions of the sidewalls 33,34. By this structure a very rigid assembly may be effected.

As in the previously described embodiment the sidewalls are provided with lower openings 44 through which the insects may pass onto the bottom panel 40 on which the bait (not shown) may be placed.

An upwardly extending generally pyramidal passageway formed of mesh and indicated at 46 may be provided in a manner similar to the passageway 18 shown in FIG. 1.

In the embodiment shown in FIGS. 4,5 the opposed sides 33,34 are formed with central crease lines 47 so that said sidewalls may be folded on themselves as shown in FIG. 5.

Although the embodiment of FIGS. 4,5 has a disadvantage of having a reduced volume at its upper end, it nevertheless has the advantage of lending itself to being expanded very quickly from the flattened condition of FIG. 5 to the expanded form of FIG. 4. Thus, it is merely necessary to grasp the sidewalls 33,34 through the openings 44 therein and pull outwardly on the same to expand the container into the shape of FIG. 1. It is a simple matter to insert the tabs 42 through the slots 43 to obtain a rigid assembly. If desired small holes 48 may be formed in the opposed sidewalls 31,32 adjacent the apex of the structure so that the trap may be suspended by a string or the like. Alternatively, grommets may be provided around holes 48.

Another modified form of the invention is shown in FIG. 6 wherein the structure 50 may be similar in construction to that shown in FIGS. 4,5 but wherein it is formed entirely of a transparent semirigid plastic sheet material such as polyethylene. In such case no cutouts of the material are required except for the lower openings 51 through which the insects may pass into the lower compartment and the aperture 52 at the upper end of the passageway 53.

Still another modified form of the invention as shown in FIG. 7 wherein a typical sidewall 61 is indicated provided with a plurality of relatively small apertures 62 struck from the material of the sidewall whether it be paperboard or plastic. It will be apparent that this structure is equally applicable to all forms of the invention disclosed.

We claim:

1. An insect trap comprising:
   a plurality of sidewalls of paperboard or like material hingedly secured together and adapted to be expanded from a relatively flat condition to form a vertically extending container,
   means in said container intermediate its upper and lower ends and forming an upwardly converging conduit having an aperture at its upper end,
   said conduit being fixedly secured to said sidewalls along the lower periphery of said conduit to permit passage of an insect into the upper end of said container only through said aperture,
   an opening in at least one of said sidewalls providing an entrance for an insect into the space below said conduit, and
   means integrally secured to said sidewalls forming a bottom for said container and a support for bait.

2. A trap according to claim 1 wherein a pair of said sidewalls are provided with folding creases to permit folding portions of said pair upon themselves to permit said container to be folded to a substantially flat form.

3. A trap according to claim 2 wherein said conduit forming means is adapted to be folded substantially flat with said sidewalls.

4. A trap according to claim 1 wherein said container is formed by two pairs of opposed rectangular sidewalls and a pair of opposite rectangular end walls.

5. A trap according to claim 1 wherein said container is formed by upwardly and inwardly converging sidewalls.

6. A trap according to claim 1 wherein said container is generally pyramidal and includes two pairs of opposed upwardly and inwardly converging sidewalls.

7. A trap according to claim 1 wherein at least one of said sidewalls includes an upper portion formed of a flexible mesh to admit light into the upper end of said container.

8. A trap according to claim 1 wherein at least one of said sidewalls includes an upper portion formed with a plurality of relatively small apertures struck from the material of said sidewalls.

9. A trap according to claim 1 wherein at least one of said sidewalls includes an upper portion of transparent semirigid plastic sheet material.